United States Patent [19]

Kaufmann et al.

[11] 4,013,282
[45] Mar. 22, 1977

[54] WORK TABLE ROLLER SUPPORT

[75] Inventors: Harold Kaufmann, Rochester; Kenneth Sprick, Zumbro Falls, both of Minn.

[73] Assignee: Di-Acro Division, Houdaille Industries, Inc., Buffalo, N.Y.

[22] Filed: June 21, 1976

[21] Appl. No.: 698,472

[52] U.S. Cl. ..................... 269/289 MR; 193/35 R
[51] Int. Cl.² ........................................... B65G 13/00
[58] Field of Search .......... 269/289 MR, 310, 54.5, 269/254 CS, 275, 285, 296, 321 A, 321 ME; 193/35 MD, 35 B, 35 R, 37

[56] References Cited

UNITED STATES PATENTS

| | | | |
|---|---|---|---|
| 1,568,362 | 1/1926 | Brown | 269/289 MR |
| 2,931,477 | 4/1960 | Metzgar | 193/35 MD |
| 3,020,993 | 2/1960 | Heinrich et al. | 193/35 MD |
| 3,874,749 | 4/1975 | Maniak | 193/35 MD |

Primary Examiner—Al Lawrence Smith
Assistant Examiner—Robert C. Watson
Attorney, Agent, or Firm—Hill, Gross, Simpson, Van Santen, Steadman, Chiara & Simpson

[57] ABSTRACT

A machine tool work table having a plurality of work piece supporting roller mechanisms is disclosed in which the roller mechanisms are detachably mounted on the table from an undersurface by means of a support strap having outturned flange ended side walls which project through the work table and rest atop surface portions of the work table openings through which the roller members project.

5 Claims, 7 Drawing Figures

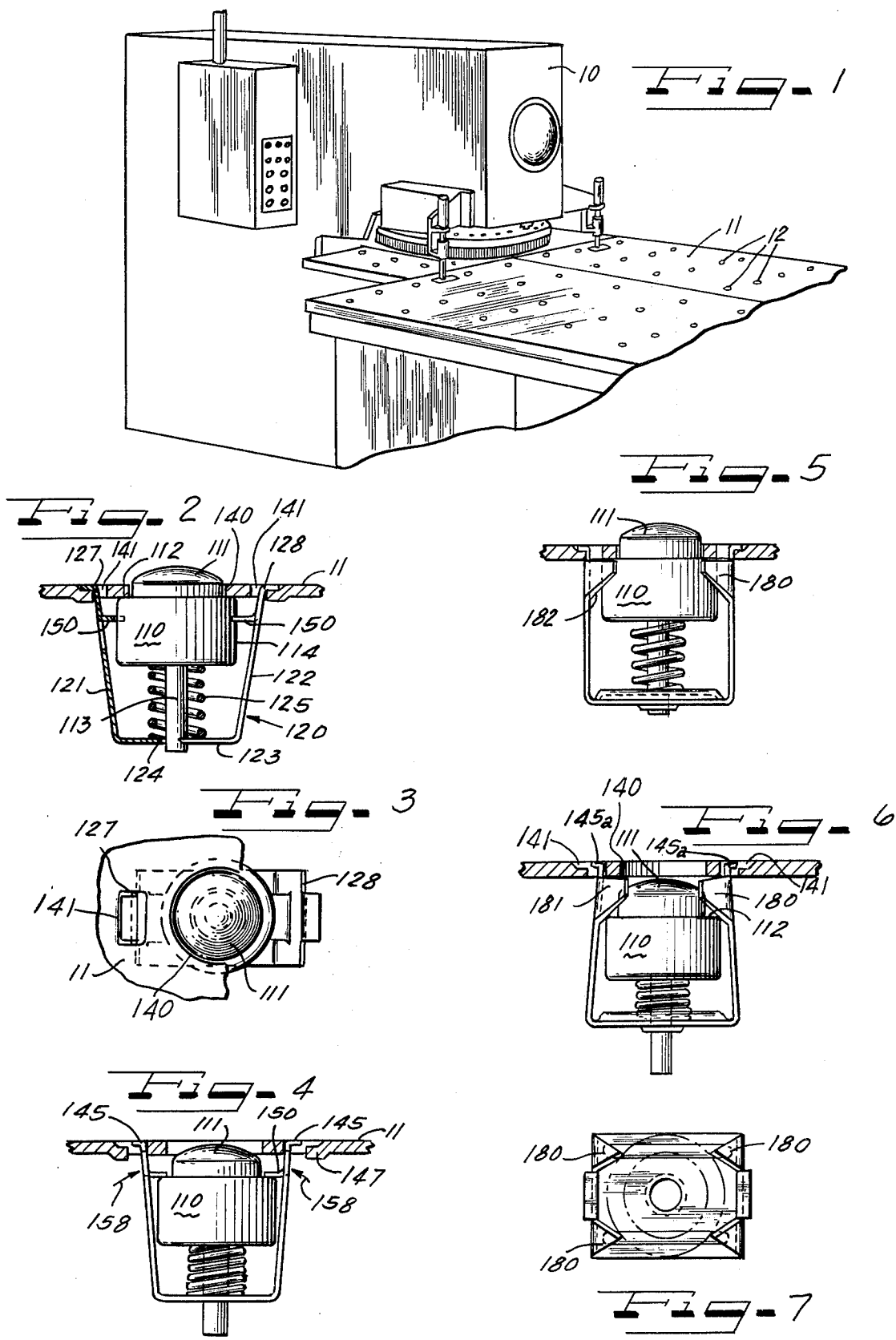

WORK TABLE ROLLER SUPPORT

BACKGROUND OF THE INVENTION

1. Field of the Invention

This invention relates to machine tools and more particularly to work piece supporting roller members for work tables.

2. Prior Art

Machine tool such as punches and the like are generally equipped with work tables on which a work piece, such as a mass or sheet of metal is supported and on which it may be moved to properly position it with respect to the tool which is to act upon it.

The rollers are primarily antifriction devices which are designed to allow ease of movement of the work piece on the work table. To this end, the roller normally constitutes a ball or other rolling element which is received in a housing which encloses a portion of the rolling element and from which the work piece contacting portion of the rolling element projects. In those cases where the rolling element is a ball, the ball is generally submerged below its diameter in the housing and is retained in the housing by means of an opening in the housing through which the ball projects, the opening having a diameter less than the full diameter of the ball. Permanent lubricating means or other features may be provided in the housing with the rolling element being supported in the housing in such a manner as to allow it to turn within the housing in a relatively friction free manner.

Heretofore, the roller assemblies which include the roller member, its affiliated housing, and any internal mechanisms, were attached to the work table in a permanent manner such as by welding or the like. It has also been known to use envelope type work tables with the roller members entrapped between parallel top and bottom table defining sheets. Since a relatively large number of such roller members are required for each work table, the prior methods of attachment were expensive, labor intensive and, in general, unsatisfactory.

Additionally, because of damage or for other reasons, it sometimes became desirable to replace such roller members. However, heretofore, the roller members, because of their permanent attachment, were for all practical purposes impossible to replace. It would therefore be an advance in the art to provide a simplified means of attaching the roller members to the work table, which means and apparatus reduces the expense of attaching the roller members while at the same time allowing replacement if necessary.

SUMMARY OF THE INVENTION

The present invention overcomes the disadvantages associated with attachment of roller members to work tables encountered in the prior art. The roller members of this invention are inserted from underneath the work table and have the roller element projecting through an aperture in the work table. The roller member is attached to the work table by means of a strap member or spring clips which is substantially U-shaped in cross-section having an underlying bight section disposed beneath the housing of the roller member and upstanding arm members which form side walls and which project through apertures in the work table adjacent the roller aperture. The side walls terminate in outturned flanges which overlie recessed portions of the work table. A spring interposed between the roller member assembly and the bight of the attachment strap functions to both urge the roller member into full projecting position while giving it a resiliency while at the same time drawing the outturned flanges into secure seated contact with the recessed surfaces of the top of the work table.

Preferably the straps or the like are yieldable and have a degree of resiliency causing the wall members to spread away from one another thereby again assuring that firm seated contact will occur. Additionally, the straps are formed so as to be unremovable from the table when the roller member projects above the surface of the work table. This is accomplished by having inwardly projecting portions of the side walls which extend into engagement with the periphery of the roller housing thereby preventing the side walls from being drawn towards one another to a point where they could withdraw through the openings in the work table. The inward projections also function to retain the roller housing in position during insertion into place in the work table from the underside thereof.

It is therefore an object of this invention to provide an improved roller member attachment for work tables.

It is another more particular object of this invention to provide a roller member assembly for work tables wherein the roller member is attached to the work table from the underside thereof and suspended by a strap member.

It is another and more particular object of this invention to provide roller members for work tables wherein the roller member is received in a housing retained against an undersurface of the work table with a roller element projecting through an aperture in the work table to a work contacting position above the work table, the roller member housing being retained in position by a strap member having a portion thereof underlying the roller member housing and support side walls projecting through apertures in the work table and terminating in outturned flanges overlying surface portions of the work table with means provided to prevent accidental withdrawal of the strap member flanges through the work table apertures.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a fragmentary perspective view of a machine tool equipped with roller members according to this invention.

FIG. 2 is a partially sectioned view of a work table equipped with a roller member assembly according to this invention.

FIG. 3 is a top plan view of the roller member assembly of FIG. 2 with portions broken away to show underlying portion.

FIG. 4 is a view similar to FIG. 2 illustrating a removal or insertion position of the roller member assembly of FIG. 2.

FIG. 5 is a view similar to FIG. 2 showing a modified form of the roller member assembly.

FIG. 6 is a view similar to FIG. 4 showing the modified form of the roller member assembly in an insertion or removal position.

FIG. 7 is a top plan view of the attachment strap of the modified form of FIGS. 5 and 6.

DESCRIPTION OF THE PREFERRED EMBODIMENTS

FIG. 1 illustrates a machine tool 10 such as a turret punch equipped with a work table 11 having a number of work piece supporting rollers 12 thereon.

In order to provide ease of movement of the work piece, the table 11 is provided with a plurality of roller members 12. As best illustrated in FIGS. 2, 3, and 4, the roller members include a cup housing 110 which receives a ball or other roller 111 and retains the same for rotation therein. The cup housing 110 has a shaft 113 projecting from a bottom thereof. Additionally, it has a peripheral ledge 112 extending outwardly from the roller 111 to the cylindrical side wall 114 of the cup housing 110. The roller member is received in a spring clip or strap 120 which is substantially U-shaped having arms 121 and 122 interconnected by a bight section 123 which has an opening 124 through which the shaft 113 projects. A spring 125 is interposed between the bight section 123 and the undersurface of the cup housing 110 urging the cup housing away from the bight section. The spring clip or strap is preferably made of resilient material with the arms 121, 122 resiliently urged away from one another so that their free ends 127 and 128 will be spaced apart considerably wider than the width of the bight. The table top 11 has a plurality of substantially circular openings 140 therein which have a diameter less than the diameter of the cup housing 110 but greater than the diameter of the roller 111. In this manner, when the cup housing is placed against the undersurface of the table with the roller 111 projecting through the openings 140, the ledge 112 will contact the table undersurface around the opening 140 maintaining the cup housing 110 on the underside of the table with the roller 111 projecting through the opening 140. Adjacent each of the openings 140 are smaller rectangular openings 141 through which portions of the free ends of the spring clips or straps are projectable. The openings 141 for each opening 140 are dimensioned apart slightly greater than the width of the bight whereby after insertion of the free ends into the opening 141, the resilient nature of the clip will cause the free ends to move away from one another. Portions of the free ends terminate in outturned flanges 145 which then overlie the portions of the top surface 146 of the table. In order to prevent the free ends and flanges from projecting above the normal work surface, the area to be overlied is depressed as illustrated at 147 of FIG. 4.

Because the material which may be worked on by the machine tool can be quite heavy, the springs 125 are relatively strong. Thus it is possible that the action of the spring 125 could overcome the resistance of the clip material and by forcing the bight away from the table surface draw the free ends inwardly. This is eliminated by the provision of inturned lips 150 formed in the side walls 121 and 122. The lips are spaced apart a dimension such that when the cup housing 110 fills the area between the lips the inside ends of the lips contact the periphery of the cup housing, the flanges 145 will then be spaced apart a distance greater than the distance between the openings 141. Thereafter, the spring clip or strap cannot be acted upon by the spring 125 to move the legs 121, 122 towards one another because of the interference between the lips 150 and the cup housing 110.

The lips provide an additional feature in that when the cup housing is depressed towards the bight, as illustrated in FIG. 4, and the legs are urged towards one another as shown by the arrows 158, for example by grasping the legs between the thumb and forefinger, the lips 150 will overlie the ledge 112 of the cup shaped housing retaining the cup shaped housing in position in the spring clip. In this manner replacement of the roller member is relatively simple. First a roller mmember is placed in position in the spring clip or strap and depressed against the spring to a point where the lips may overlie the ledge 112. With the spring clip retained in a slightly collapsed condition, the free ends can be substantially aligned with the slots 141 and the roller 111 with the opening 140. Then the free ends can be inserted through the openings 141 substantially as illustrated in FIG. 4. Thereafter releasing the compression force on the legs of the clip will allow the flanges 145 to extend outwardly overlying the depreseed portion 147 of the table surface adjacent the openings 141. As soon as that occurs and the flange 145 are fully in position, the cup housing 110 will automatically be released from contact with the lips and will, under the influence of the spring 125 project the roller 111 through the opening 140. When in that position, the engagement of the lips 150 with the outer diameter of the cup housing 110 will prevent further collapse of the spring clip. When it is desired, however, to remove a roller assembly, all that has to be done is that the roller is pressed from the top of the table surface towards the bight to a point where the ledge 112 underlies the lips 150. Thereafter the spring clip can be compressed until the lips 150 overlie the ledge holding the cup housing in position in the spring clip and drawing the flanges 145 out of engagement with the table surface and into position to be withdrawn through the slots 141.

FIGS. 5, 6 and 7 show a modification of the spring clip wherein the lips 150 are not struck from the material of the legs 121, 122 but are rather formed as inturned ears 180 formed from side portions of the legs 121, 122. The ears 180 then have top surfaces 181 which will engage the undersurface of the table when the flanges 145a are in overlying position. FIGS. 5, 6 and 7, instead of showing a depressed portion 147, show a machined table surface, however it is to be understood that the depressed portion is preferred. Additionally, the ears have undersurfaces 182 which can engage the peripheral ledge 112 of the cup housing 110 retaining it in the depressed position shown in FIG. 6. This modification has one advantage in that the undersurfaces 182 are on an angle so that the action of the spring urging the cup housing 110 away from the bight will tend to force the ears away from one another thereby forcing the flanges 145a into proper position. As is the case with the lips 150, the ears are dimensioned such that they will contact the cylindrical periphery of the cup housing 110 in engagement therewith when the spring clip is in fully inserted position as illustrated in FIG. 5 thereby preventing unwanted collapse of the spring clip legs.

It can therefore be seen from the above that our invention provides a unique device for the attachment of roller members to machine tool work tables. The overall assembly includes a roller element positioned in a housing, the housing having a projecting member extending from a bottom thereof through an aperture in a spring clamp or strap with a spring interposed between the housing member and the strap. The strap has side walls with inturned projecting members intermediate ends thereof for engagement with the periphery of the housing and capable, when the housing is in a depressed position of retaining the housing in the depressed position and further capable of preventing inward movement of the arms when the housing is in its operative position. The arms terminate in outturned flanges which extend through apertures in the work table adjacent the roller element aperture, the tangs overlying depressed surface portions of the work table and anchoring the strap in position.

Although the teachings of our invention have herein been discussed with reference to specific theories and embodiments, it is to be understood that these are by way of illustration only and that others may wish to utilize our invention in different designs or applications.

We claim as our invention:

1. In a machine tool having a work piece supporting table, the table having a plurality of spaced apart roller members projecting above a top table surface, the improvement of the roller members comprising roller elements received in a housing, a plurality of openings in the table, said roller member projectable through said openings from an undersurface of said table, means on the housing contacting the undersurface of said table when the roller members are projecting through said openings preventing movement of the housing through said openings, a spring clip having arm portions engaging said table and a bight portion spaced from said undersurface of said table underlying said housing, spring means interposed between said bight portion and said housing urging said housing away from said bight portion, said arms having free ends opposite said bight terminating in outturned flanges, said flanges overlying portions of said table, and blocking means extending between said arms and said housing preventing movement of said arms towards one another when said housing is at a first distance from said bight, said blocking means being out of contact with said housing when said housing is at a second distance with respect to said bight closer to said bight than said first distance whereby said legs are free to move towards one another.

2. The improvement of claim 1 wherein said blocking means overlie portions of said housing when said housing is in the second position and said legs are moved towards one another, and said blocking means are effective to prevent movement of said housing away from said bight when in said overlying position.

3. A roller member assembly for machine tool work tables comprising a roller rotatably received in a housing, a substantially U-shaped spring clip for attaching said housing to said table, said spring clip including spaced apart arms interconnected at one end thereof by a bight section and having free ends at another end thereof, said free ends having outturned flanges, said arms being equipped with blocking means extending inwardly from each of said arms towards the other of said arm terminating in spaced relationship to one another, the arms being movable towards and away from one another, said housing received between said arms, spring means positioned between a bottom of said housing and said bight urging said housing away from said bight, said blocking means and said housing dimensioned with respect to one another when said housing is at a first position remote from said bight, said blocking means prevent movement of said legs towards one another and when said housing is at a second position closer to said bight than said first position, said blocking means will be out of contact with said housing and allow said legs to move towards one another to a greater extent than when said blocking means are on contact with said housing at said first position, and said blocking means effective to prevent movement of said housing away from said bight when in said second position.

4. A work piece supporting roller assembly for machine tool work tables comprising a roller element received in a housing and projecting therefrom, said roller element rotatable in said housing, an attachment strap member having a base section with a pair of arm members projecting therefrom, said arm members terminating in outturned flanges, projections extending inwardly from said arms towards one another intermediate ends of said arms, said housing received intermediate said arms, a spring member entrapped between the base section and said housing urging said housing away from said base section and said arms yieldable whereby they may be urged towards and away from one another.

5. In a machine tool work table having a plurality of roller members projecting above the surface thereof, the improvement of said roller members attached to said work table by receipt of the roller members in a housing having an outside dimension greater than the dimension of the roller member, the housing positioned on an undersurface of the work table having a peripheral portion engaging the undersurface adjacent an aperture through which the roller member projects, a strap member having a base portion and a pair of extending arms, the extending arms extending through secondary apertures in the work table from the undersurface thereof and having portions overlying top surface portions of the work table, the housing received between the arms with the base portion underlying the housing and the strap supporting the housing in contact with the under surface of the work table.

* * * * *